United States Patent [19]
Rhodes et al.

[11] Patent Number: 5,952,587
[45] Date of Patent: Sep. 14, 1999

[54] IMBEDDED BEARING LIFE AND LOAD MONITOR

[75] Inventors: John H. Rhodes, Torrington; Richard L. Lemoine, Collinsville; Richard W. Browner, Waterbury; Mark A. Fuller, Torrington; Mark I. Jurras, III, Canton Center; David Nguyen, Farmington, all of Conn.

[73] Assignee: The Torrington Company, Torrington, Conn.

[21] Appl. No.: 09/130,332

[22] Filed: Aug. 6, 1998

[51] Int. Cl.⁶ .................................................. G01L 1/00
[52] U.S. Cl. ............................................... 73/862.541
[58] Field of Search .................. 73/862.541, 862.55, 73/862.635

[56] References Cited

U.S. PATENT DOCUMENTS

| | | |
|---|---|---|
| 3,745,819 | 7/1973 | Earl . |
| 3,902,363 | 9/1975 | Ishimoto ........................ 73/862.451 X |
| 4,015,468 | 4/1977 | Simon ................................ 73/862.541 |
| 4,024,755 | 5/1977 | Quehen ........................... 73/862.474 X |
| 4,095,852 | 6/1978 | Schutz . |
| 4,117,719 | 10/1978 | Schutz . |
| 4,145,919 | 3/1979 | Bauer et al. . |
| 4,161,877 | 7/1979 | Bauer et al. . |
| 4,168,160 | 9/1979 | Stoferle et al. .................... 73/862.541 |
| 4,175,430 | 11/1979 | Morrison et al. . |
| 4,203,319 | 5/1980 | Lechler . |
| 4,281,539 | 8/1981 | Keller ............................. 73/862.474 X |
| 4,341,122 | 7/1982 | Lechler et al. . |
| 4,406,169 | 9/1983 | Ikeuchi et al. . |
| 4,667,521 | 5/1987 | Fuss et al. ......................... 73/862.541 |
| 4,704,895 | 11/1987 | Boing et al. ..................... 73/862.541 X |
| 4,911,024 | 3/1990 | McMaster . |
| 4,989,457 | 2/1991 | Berger et al. .................... 73/862.541 X |
| 5,033,317 | 7/1991 | Van Haag . |
| 5,065,361 | 10/1991 | Roberts . |
| 5,140,849 | 8/1992 | Fujita et al. . |
| 5,159,841 | 11/1992 | Montalvo, III et al. . |
| 5,263,372 | 11/1993 | Matsuzaki et al. . |
| 5,503,030 | 3/1996 | Bankestrom . |
| 5,517,858 | 5/1996 | Matsuzaki et al. . |

OTHER PUBLICATIONS

Catalog 500; Part B–Strain Gage Technical Data (2 pp.).
Tedric A. Harris, Rolling Bearing Analysis, (4 pp.).
Distribution of Load in Statically Loaded Bearings (8 pp.).

*Primary Examiner*—Richard Chilcot
*Assistant Examiner*—Jewel V. Thompson
*Attorney, Agent, or Firm*—John C. Bigler

[57] ABSTRACT

A system senses real-time rolling element loads in a rolling element bearing having a plurality of rolling elements disposed between an inner race and an outer race. A plurality of sensors are disposed about one of the inner race and the outer race of the bearing to output sensor data corresponding to detected loads. A control unit predicts bearing life from the sensor data and determines a load zone of the bearing in real time from the sensor data. Before operation of the system in real-time, the sensors are calibrated to model a relationship of roller load and measured strain. The bearing is then rotated and sensor data is output from each the sensors. The sensor data is cyclical, and peaks and valleys are extracted from the sensor data to determine rolling element loads and measured bearing speed. Load components from a plurality of bearings are then summed to obtain total applied system load in real time.

34 Claims, 11 Drawing Sheets

IMBEDDED BEARING LIFE AND LOAD MONITOR

BACKGROUND OF THE INVENTION

The present invention relates generally to sensing of bearing loads and predicting of bearing life for anti-friction bearings, and more particularly to sensing of individual loads for a plurality of rolling elements in anti-friction bearings to characterize the load zone and predict useful life.

In its simplest form, a bearing includes a shaft or "journal" which is configured and arranged to be rotatably received within a mating hole of a structure. Anti-friction bearings or "rolling element bearings" are a type of bearing in which a plurality of rolling elements are disposed between the journal and mating hole to reduce friction.

The rolling elements of anti-friction bearings may take many forms, but are principally classified as balls or rollers. The rollers may likewise take a variety of forms, which are principally uniform cylinders, barrels or cones, depending upon the application.

A unique feature of rolling element bearings is that their useful life is not determined by wear, but rather by fatigue of the operating surfaces due to repeated stresses associated with use. It is generally accepted that fatigue failure of rolling element bearings occurs as a result of progressive flaking or pitting of the surfaces of the rolling elements and the surfaces of corresponding bearing races. This flaking and/or pitting causes the rolling elements to seize, thereby generating intense heat, pressure and friction.

Heretofore, efforts to predict useful life of rolling element bearings have centered around testing of the bearing as a whole. For example, to predict bearing life, a number of similar bearings are conventionally tested to failure while applying respectively varying rotational speeds and applied pressures. Conventional theories for predicting useful life of rolling element bearings have thereby sought to correlate measurable external factors of the bearing, such as applied load, temperature, and rotational speed, etc., with experimentally determined bearing failure points.

A number of conventional force measuring devices have been used to determine total applied force to a bearing. Lechler et al. set forth in U.S. Pat. No. 4,341,122 that the radial component of total applied force to a rolling element bearing may be measured through the use of strain gauges. According to Lechler et al., multiple strain gauges are used to compensate for changes in temperature during the calculation of total radial load. Likewise, Fujita et al. set forth in U.S. Pat. No. 5,140,849 that first and second strain gauges may be arranged in a perpendicular relation with respective output signals connected in a bridge circuit. According to Fujita et al., one of the strain gauges is used to measure strain while a perpendicular strain gauge provides for temperature compensation through electrical connection in the bridge circuit. Conventional force measuring devices for bearings have focused on the bearing as a whole. As a consequence, conventional force measuring devices have failed to accurately model forces which are dynamically exerted upon respective bearing rolling elements during rotation.

Conventional force measuring devices also suffer from a disadvantage in that a load zone of a bearing may not be accurately characterized during operation.

The foregoing illustrates limitations known to exist in present devices and methods. Thus, it is apparent that it would be advantageous to provide an alternative directed to overcoming one or more of the limitations set forth above.

Accordingly, a suitable alternative is provided including features more fully disclosed hereinafter.

SUMMARY OF THE INVENTION

In one aspect of the invention, this is accomplished by providing a system for sensing rolling element loads in a rolling element bearing having a plurality of rolling elements disposed between an inner race and an outer race. A plurality of sensors are disposed about one of the inner race and the outer race of the bearing to output sensor data corresponding to detected loads caused by the rolling elements. A plurality of connecting members are respectively connected to each of the plurality of sensors to transmit the sensor data, and a control unit receives the sensor data from the plurality of connecting members. Bearing life is then predicted from the sensor data.

In another aspect of the invention, the disadvantages of the prior art are overcome by providing a method of predicting bearing life in a rolling element bearing including the steps of sensing individual loads caused by a plurality of rolling elements in the rolling element bearing and calculating bearing life from the individual loads sensed in the sensing step.

The foregoing and other aspects will become apparent from the following detailed description of the invention when considered in conjunction with the accompanying drawing figures.

DETAILED DESCRIPTION

Figure 1:
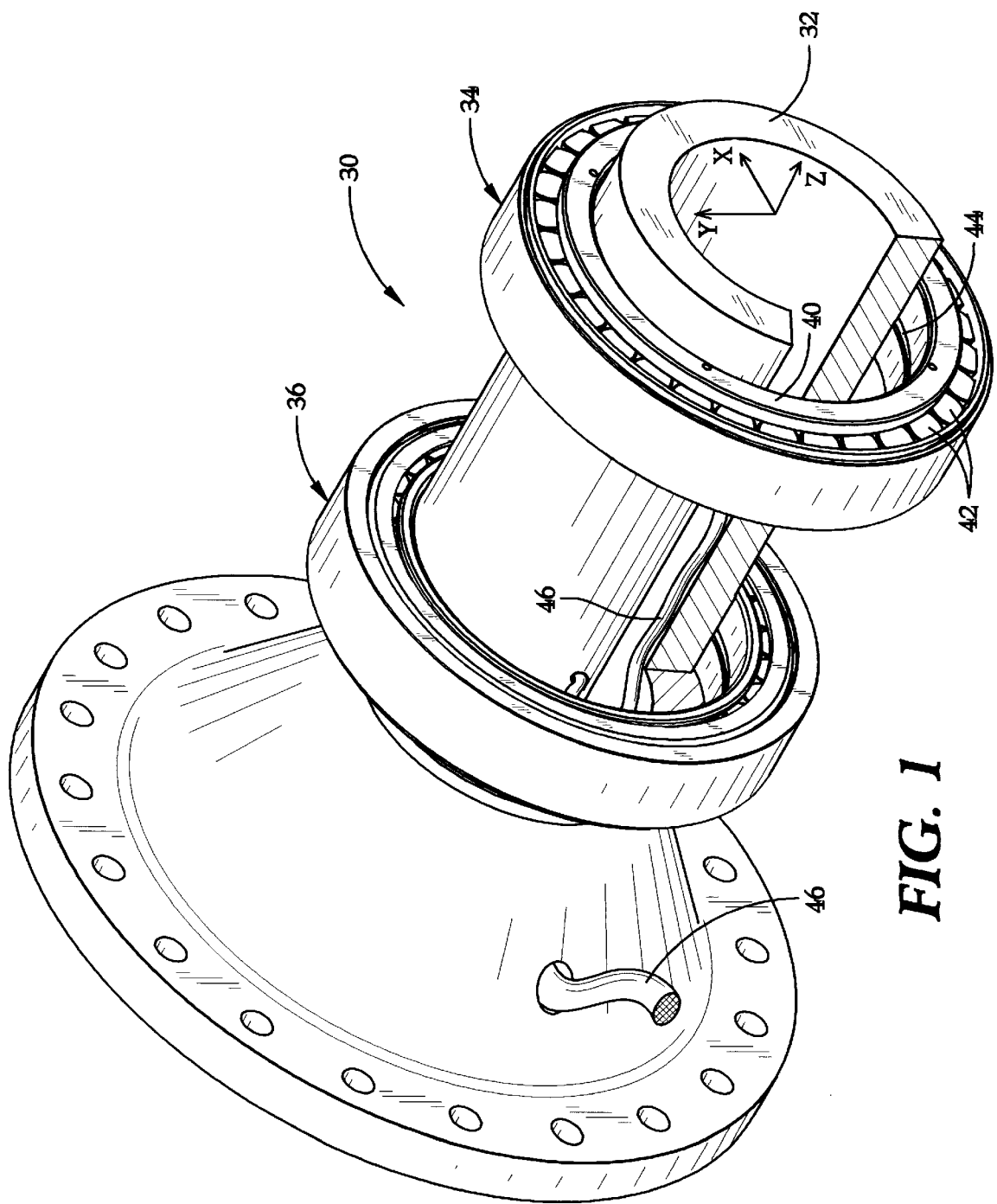
FIG. 1 is an elevated perspective view of a rolling element bearing assembly including a plurality of force sensors according to an embodiment of the present invention.

With reference now to the drawings and more particularly to FIG. 1, a real-time bearing load sensing system and life prediction system are disclosed. FIG. 1 illustrates a bearing assembly 30 including a hollow spindle 32 which rotates with respect to a support structure (not shown). Hollow spindle 32 is supported by bearing 34 and bearing 36. By way of example, bearing 34 includes an outer race 38, inner race 40 and a plurality of rolling elements 42. A plurality of sensors 44 is disposed about inner race 40 to measure applied load from the rolling elements 42. A plurality of conductive wires 46 transmit measured sensor data output by sensors 44 to a control unit (not shown) for subsequent processing.

Figure 2A:
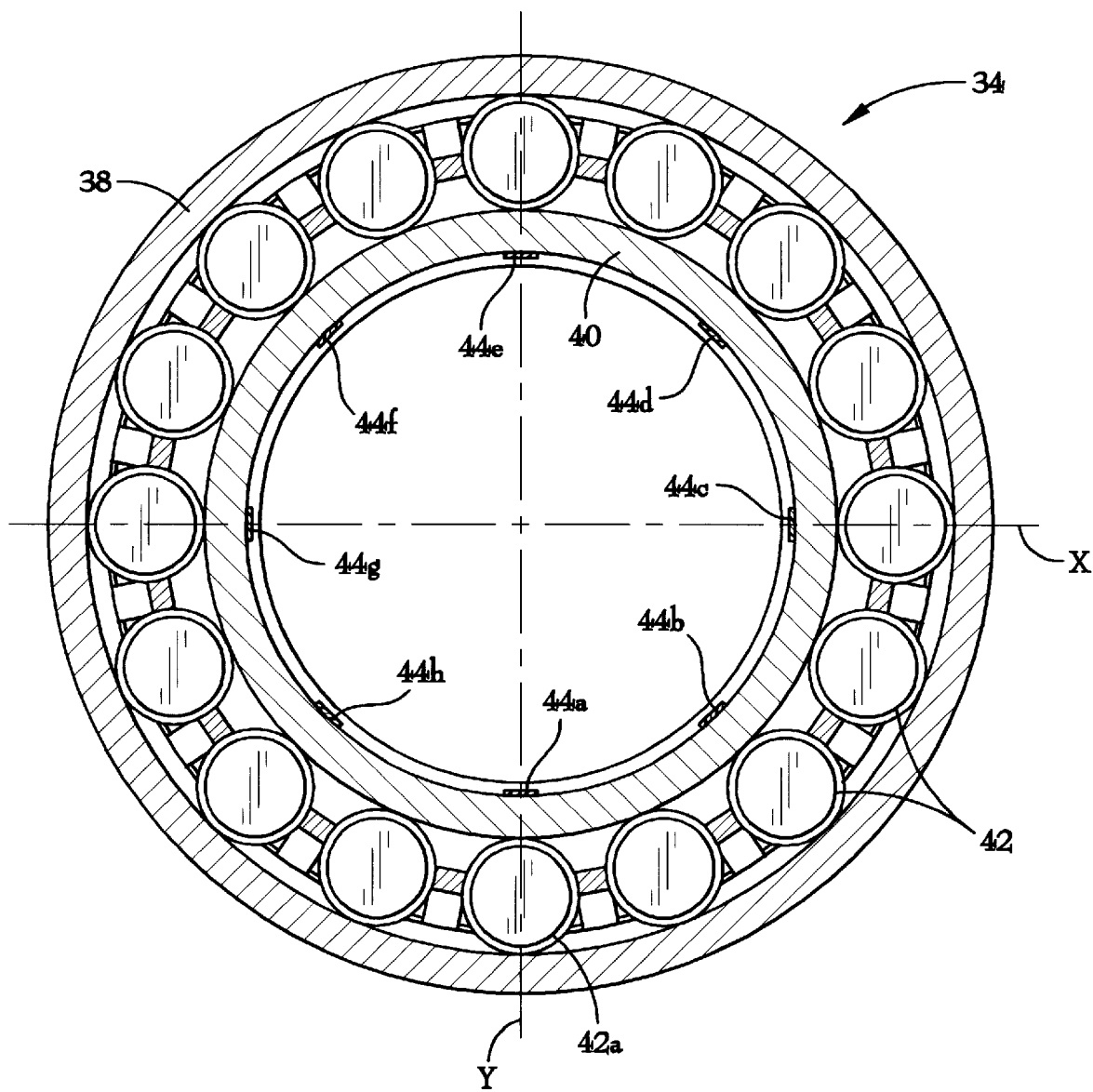
FIG. 2A is a sectional view of a rolling element bearing taken along the X and Y plane of FIG. 1, wherein sensors are disposed about an inner bearing race.

FIG. 2A is a sectional view of bearing 34 taken along the X and Y plane of FIG. 1. As illustrated in FIG. 2A, bearing 34 includes sixteen rolling elements 42 which are ideally evenly spaced between outer race 38 and inner race 40. It will be apparent to those skilled in the art that the number of rolling elements within bearing 34 will vary depending upon the application and intended use.

According to the embodiment illustrated in FIG. 2A, sensors 44 are spaced about the interior periphery of inner race 40. It has been determined that a one to one correspondence between sensors 44 and rolling elements 42 is not required for an accurate determination of load distribution. This is due, in part, to the movement of rolling elements 42 during sensing of the load distribution.

Figure 2B:
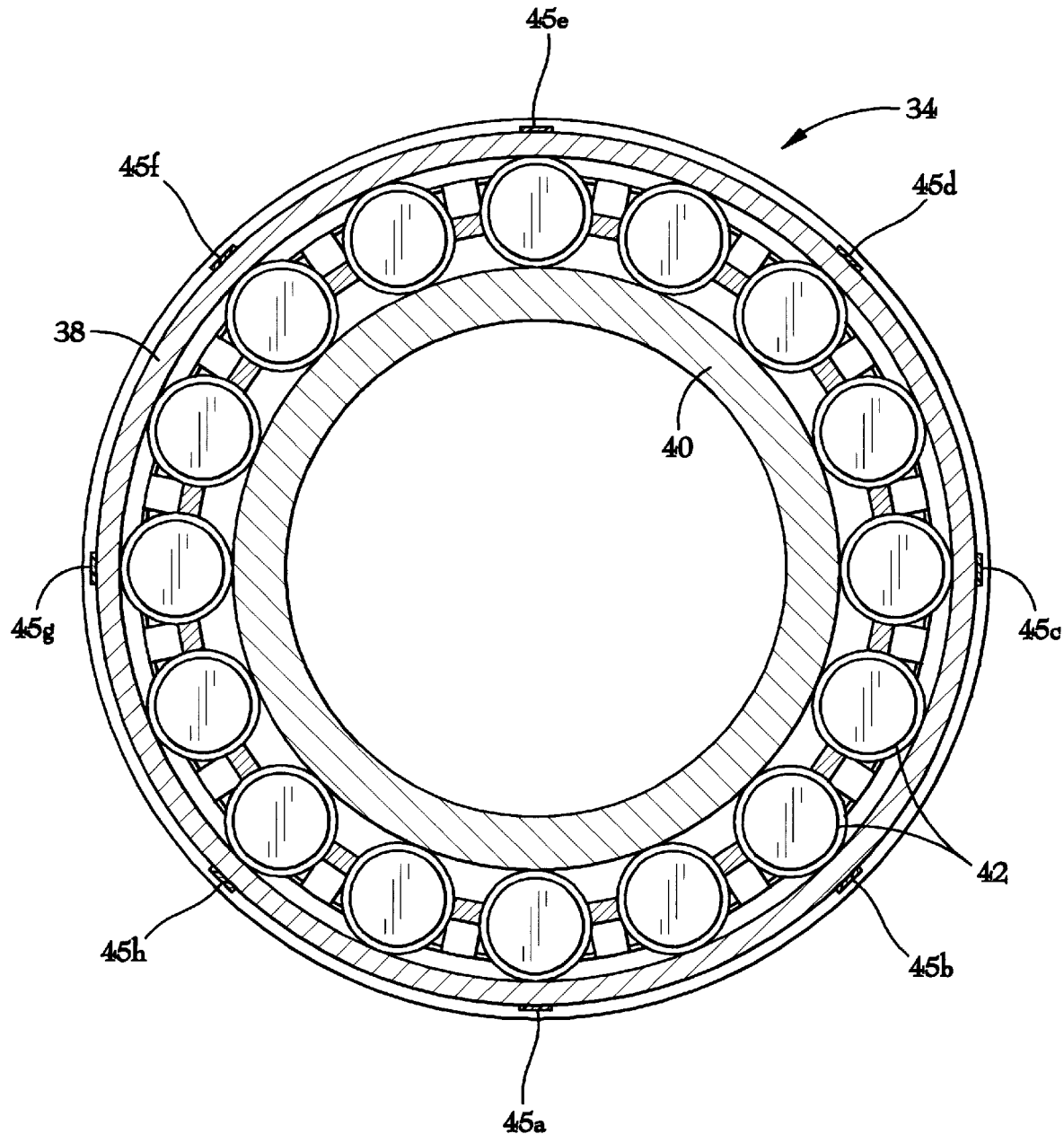
FIG. 2B is a sectional view of a rolling element bearing according to another embodiment of the present invention, wherein sensors are disposed about an outer bearing race.

FIG. 2B is a sectional view of a rolling element bearing according to another embodiment of the present invention. As illustrated in FIG. 2B, bearing 34 includes an inner race 40 and an outer race 38 supporting a plurality of rolling elements 42. According to the embodiment of FIG. 2B, sensors 45 are disposed about outer race 38. Placement of sensors 45 about outer race 38 is preferred for embodiments where the outer race remains stationary with respect to a supporting structure and inner race 40 rotates with respect to the supporting structure, such that sensors 45 may be readily connected to control unit 56. For embodiments where the inner race remains stationary with respect to a supporting structure and the outer race rotates, the embodiment illustrated in FIG. 2A is preferred.

In theory, the most accurate description of a load distribution in a bearing is obtained by mounting as many sensors on a race as possible. However, a practical upper limit for the number of mounted sensors in the bearing is equal to the number of rolling elements in the bearing because, in the bearing life calculation set forth below, each rolling element is associated with a single load value.

However, reasonably good estimates of the loads on each rolling element and, accordingly, a reasonably good estimate of bearing life can be made with a number of sensors which is less than the number of rolling elements. For each rolling element position in which no gauge is present, an interpolation routine is used to infer the loads for the missing sensors. In the present embodiment, a cubic spline is used to determine loads at the rolling element positions in which no sensor is present. The cubic spline technique uses measurements beyond the two sensors immediately straddling a missing sensor position, and therefore provides a better estimate than could be obtained using a linear interpolation routine, which otherwise is a viable alternative. However, as the number of sensors used is reduced, the error in the bearing life calculation set forth below increases.

Figure 3:
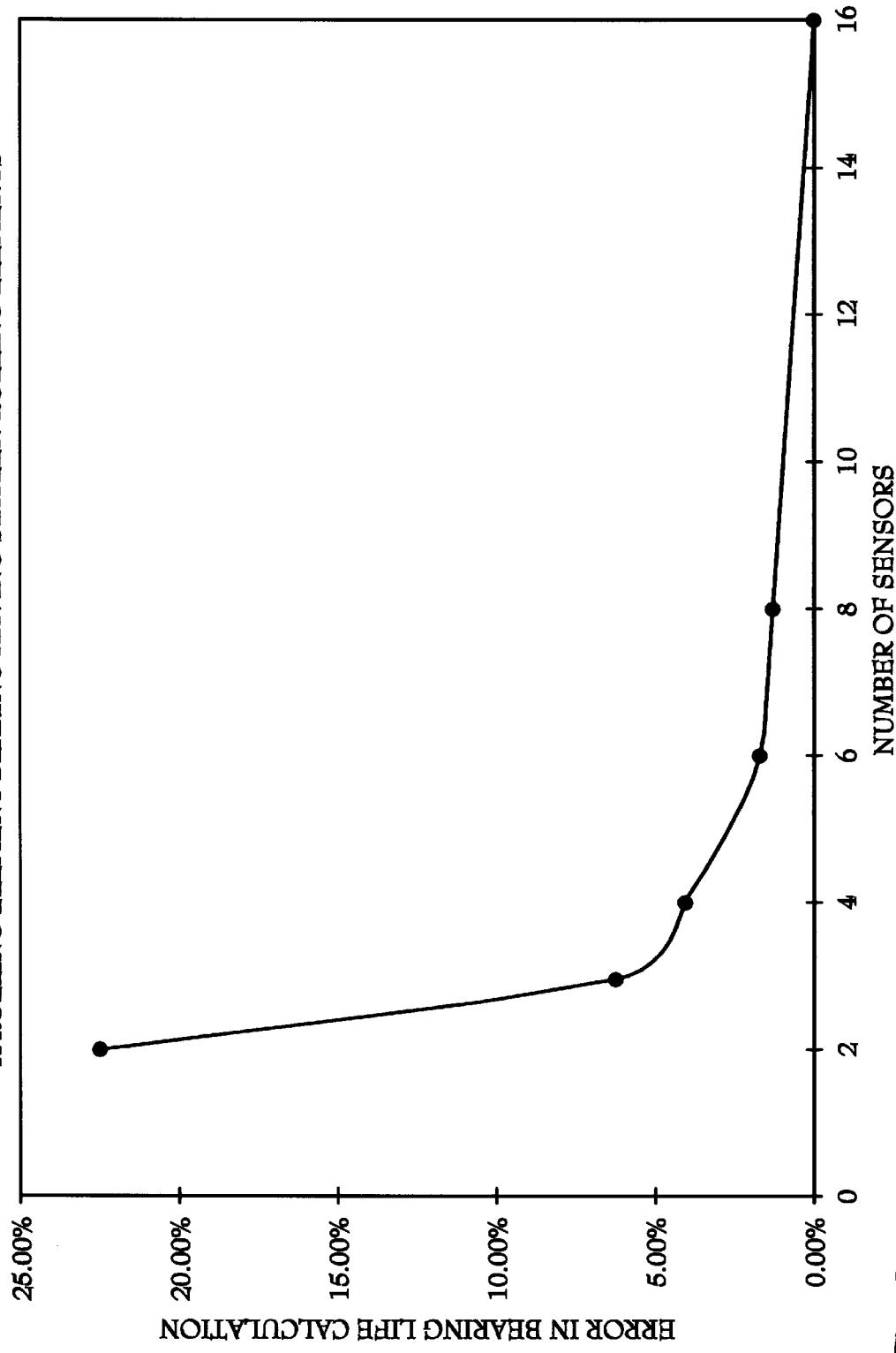
FIG. 3 is a graph illustrating a relationship between a number of force measuring sensors and error in a bearing life calculation.

FIG. 3 is a graph of Error in Bearing Life Calculation based upon measured data from multiple sensors in a rolling element bearing having thirty rolling elements. For a bearing having thirty rolling elements, a bearing life calculation has been performed using a total of 2, 3, 4, 6, 8, and 16 sensors. As illustrated, there is a dramatic difference in error when using two sensors when compared to three or four. The use of three sensors provides an error of approximately 6%, while the use of four sensors provides an error of less than 5%. The use of six sensors provides an error of approximately 2%, which is significantly close to an error of approximately 1.5% obtained when using 8 sensors.

While a minimization of the error rate to 0% is preferable from a mathematical perspective, it has been determined that an error rate less than 5% provides meaningful data. An error rate in the range of 3% is more preferable.

There is a considerable amount of labor involved to install sensors 44 within a bearing assembly and to connect corresponding data lines between the sensors and a control unit. The amount of labor involved is directly proportional to the number of sensors used. It has been determined that the use of eight sensors evenly spaced about the bearing is preferred. The use of eight evenly spaced sensors, for example at 0°, 45°, 90°, 135°, 180°, 225°, 270°, and 315°, will provide enough data to characterize the load zone about the bearing. Moreover, the use of eight sensors corresponds to an error of approximately 1.5%, which provides meaningful data.

The location of sensors about the shaft has an effect on the data and reliability of the bearing life calculation set forth below. According to an embodiment of the present invention, sensors 44 are evenly spaced about bearing 34 as illustrated in FIG. 2A. However, according to another embodiment of the present invention, sensors 44 are only placed at the horizon of the bearing (the X axis) and below. As illustrated in FIG. 2A, sensors 44a, 44b, 44c, 44g, and 44h are used. Under ideal conditions, the load zone for an applied radial load onto bearing 34 will be distributed at the horizon or below. Accordingly, placement of the sensors at the horizon or below seeks to enhance the detection of meaningful data and minimize the amount of labor involved during installation of the sensors.

To provide the most accurate data, each of the sensors 44 is preferably placed at an axial location of a corresponding pressure center for each of the rolling elements 42. The pressure center is a location on the race in which a maximum force corresponding to a rolling element occurs. The pressure center is coincidental to the axial center of the rolling element in cylindrical roller and radial ball bearings, but is offset from the axial center of the rolling element in tapered roller and angular contact bearings due to a contact angle of the bearing. Thus, when the bearing 34 is at rest, sensors 44 are aligned to rolling elements 42 with respect to their corresponding pressure centers.

A load applied to a shaft-mounted bearing through a shaft is transferred to a support structure through the bearing inner race, the rolling elements and the bearing outer race. The distribution of load among the rolling elements is determined by the clearance in the bearing, the clearances between the bearing and the support structure, and the shape and stiffness of the bearing and support structure.

The loads experienced by the bearing races are applied to the races by the rolling elements at the points or lines of contact between the rolling elements and the bearing races. These loads are called rolling element loads. Where the angle of contact between the rolling element and race exceeds 45°, the bearing is said to be a thrust bearing, since the primary load being supported by the bearing is in the axial, or thrust, direction. The present invention relates equally well to both radial and thrust bearings. If these rolling element loads are determined through measurement, the applied load on the bearing may be calculated by summing the rolling element loads as vectors in space around the bearing. That is, the sum is performed while accounting for the angular position of each rolling element in the bearing. The rolling element loads are resolved into the three mutually-orthogonal components in Cartesian space, like components are summed, and the magnitude and direction of the resultant vector are determined from the vector sum of the three components.

Figure 4:
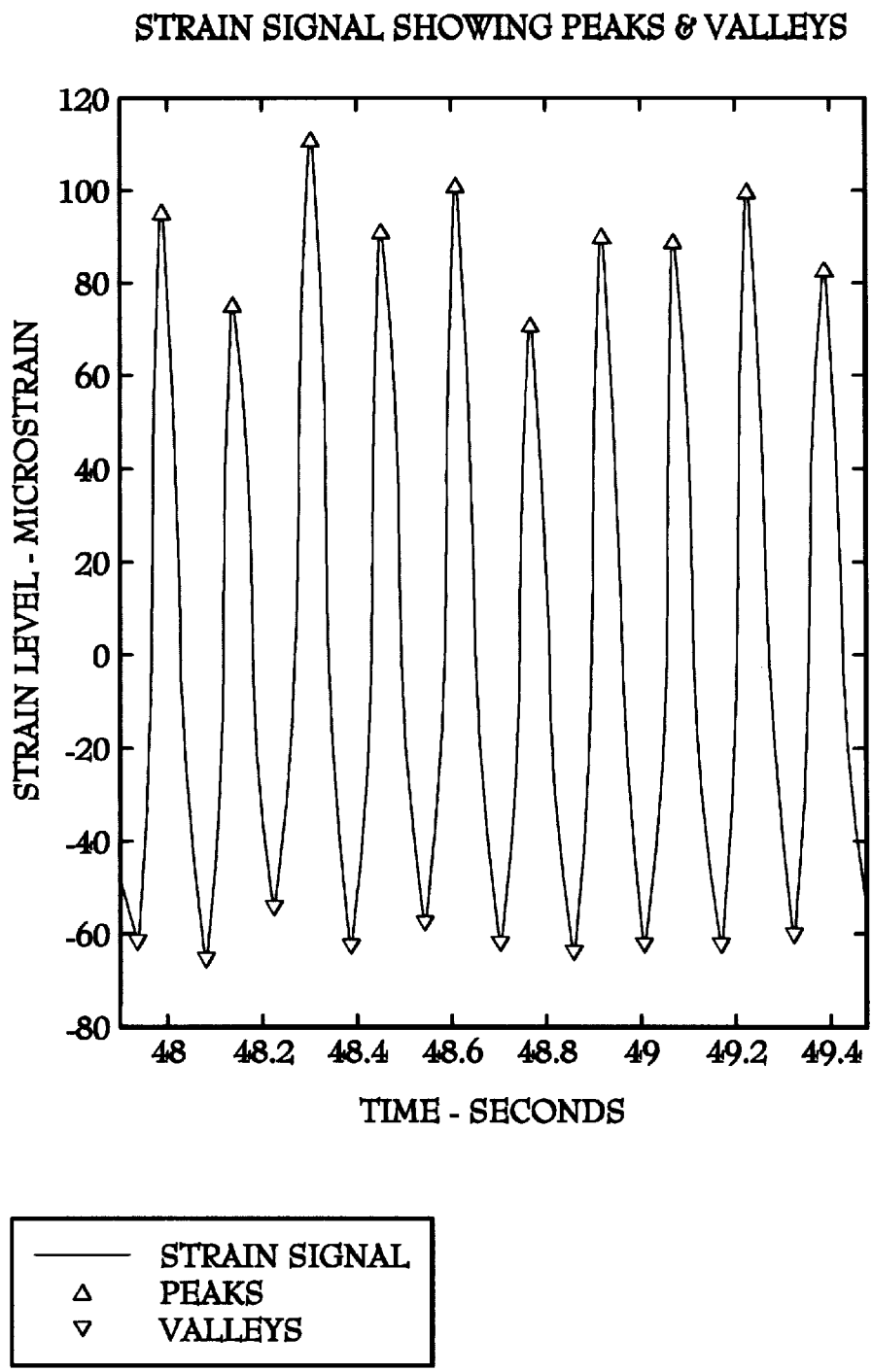
FIG. 4 is a graph illustrating sensor output during rotation of rolling elements about a bearing.

FIG. 4 is a graph illustrating sensor output during rotation of rolling elements 42 about bearing 34 illustrated in FIG. 2A with sensors 45 mounted on inner race 40. During rotation of the rolling elements, the sensor output from each sensor 44 provides data corresponding to load exerted at a corresponding bearing position. In FIG. 4, valleys 50 correspond to a point in time when a rolling element passes a sensor location. As the rolling element passes the sensor location, the structure supporting the sensor elastically deforms in response to pressure exerted from the passing rolling element (higher compression). Thus, valleys 50 represent points of maximum deformation of a supporting structure and maximum output from the sensor. On the other hand, peaks 48 represent points of tension when two rolling elements straddle the sensor location. A control unit (not shown) is connected to conductive wires 46 and thereby receives electrical signals output from the sensors 44.

Bearing speed is determined from the passage of rolling elements by the sensors. Each rolling element passage is characterized by a valley, peak and two zero crossings. That is, for each rolling element passage, the strain reading moves from a valley through an upward zero crossing to a subsequent peak, then back through a downward zero crossing to the next valley.

In the preferred embodiment, the upward zero crossings are detected for one selected gauge. The criteria used to select the gauge for timing of rolling element passage is that it be in the loaded portion of the bearing, where the rolling elements are continuously in contact with the race. In this case, a signal is reliably present. The time between upward zero crossings establishes the speed of the rolling element passage by the sensors on the race on which they are installed. Before determining where the zero crossings occur, the strain gauge data may be filtered first to remove frequencies far below the rolling element pass frequency (particularly the zero-frequency component, or offset, that may be present in the data). This operation is performed using either a bandpass or a highpass filter. An equivalent technique would be to provide a lowpass filter to the signal then subtract the result from the original signal. Any method for effectively removing this low-frequency content may be employed to increase the reliability of the zero-crossing operation.

After the upward zero crossings are detected, the subsequent peak and valley are recorded as the characteristic strains for that rolling element passage. While the peaks and valleys could be detected directly, using the zero crossings provides a more accurate and reliable method for locating the peaks and valleys, as it is less sensitive to noise and spurious values.

According to a preferred embodiment of the present invention, sensors 44 are in the form of strain gauges which change in resistance in response to deformation. However, sensors 44 may take the form of load cells or other types of sensors which are well known in the art.

The output signals used in the following calculations are from strain gauges which are mounted in a stationary inner race and which are evenly dispersed about a radius of the inner race. The output signals will vary with the passage of rolling elements by the strain gauges.

According to another embodiment of the present invention, the gauges are placed on pitch with respect to corresponding rolling elements. This provides simultaneous readings from all sensors but also requires different gauge placements for bearings having different numbers of rolling elements.

According to still another embodiment of the invention, the gauges are offset from an even pitch by a predetermined amount so that all of the gauges report their measurements sequentially through one data channel, albeit with more complex processing, to separate the peaks and valleys from the data supplied by each gauge. Accordingly, a speed measurement of the bearing may have enhanced resolution and the number of data channels required to take readings from the gauges may be reduced. In fact, readings may be taken from all of the gauges through one channel even if they are on even pitch through rapid sampling, although the actual peak readings from each gauge may be missed for low sampling rates.

In any case, the above-described zero crossing technique used to time the roller passages will accommodate many arrangements of gauges. This is because the phase shift between gauges is eliminated when the readings from all of the gauges during one roller passage are assumed to occur at the same time as the reading from the gauge selected for speed measurement. Other techniques could be employed where the time of each measurement is recorded precisely and the phase relationship between the gauges is maintained, but the processing is simpler using the preferred technique, and the error is limited to the duration of one roller passage. As set forth below, the duration of passage of one rolling element is very small.

Figure 5:
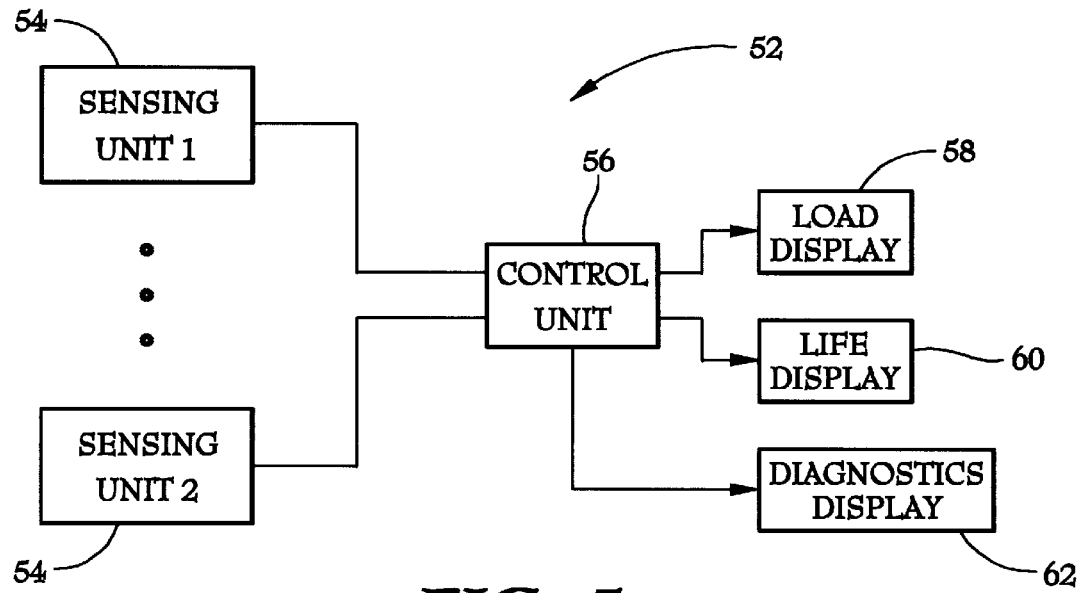
FIG. 5 is a block diagram of a system for detecting and analyzing real-time data of a rolling element bearing load zone.

FIG. 5 is a block diagram of a system 52 for detecting and analyzing real-time data of a load zone for a rolling element bearing. System 52 includes a plurality of "n" sensing units 54 which output real-time sensor data corresponding to load from a plurality of rolling elements in rolling element bearings. Control unit 56 is preferably a microprocessor.

Control unit 56 analyzes the sensor data output from sensors 54 and calculates load data which characterizes the load zone of the bearing. The load data is then displayed in real-time by load display 58. Control unit 56 also calculates life data from the sensor data and thereby predicts useful life of the bearing in real-time. The control data is displayed by life display 60. Control unit 56 may additionally produce diagnostic data which monitors the operating condition of system 52. The diagnostic data is displayed in real-time by diagnostic display 62.

Figure 6:
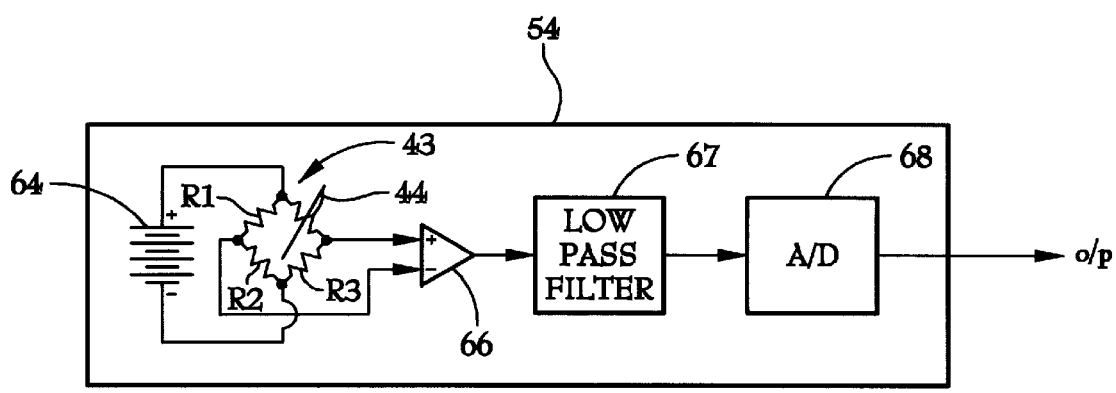
FIG. 6 is a schematic diagram of a sensing unit used to detect force in a rolling element bearing.

FIG. 6 is a schematic diagram of a sensing unit 54 when the sensor is in the form of a strain gauge. Each sensing unit 54 includes a sensor 44, which is preferably a strain gauge. Sensor 44 is modeled in the schematic diagram of FIG. 6 as a variable resistor. Sensor 44 is then connected to a ¼ bridge completion circuit 43 having resistors R1, R2 and R3. Power is supplied to bridge completion circuit 43 via power supply 64. While a h bridge circuit is preferable, a ½ bridge or full bridge circuit may also be used with additional strain gauges. The output from the bridge circuit is then applied to an amplifier 66 to boost the signal level, making it less sensitive to noise. The resulting analog signal is then passed through an optional low pass filer 67 and is converted to digital form by A/D conveter 68.

Calculation of Bearing Life

Figure 7:
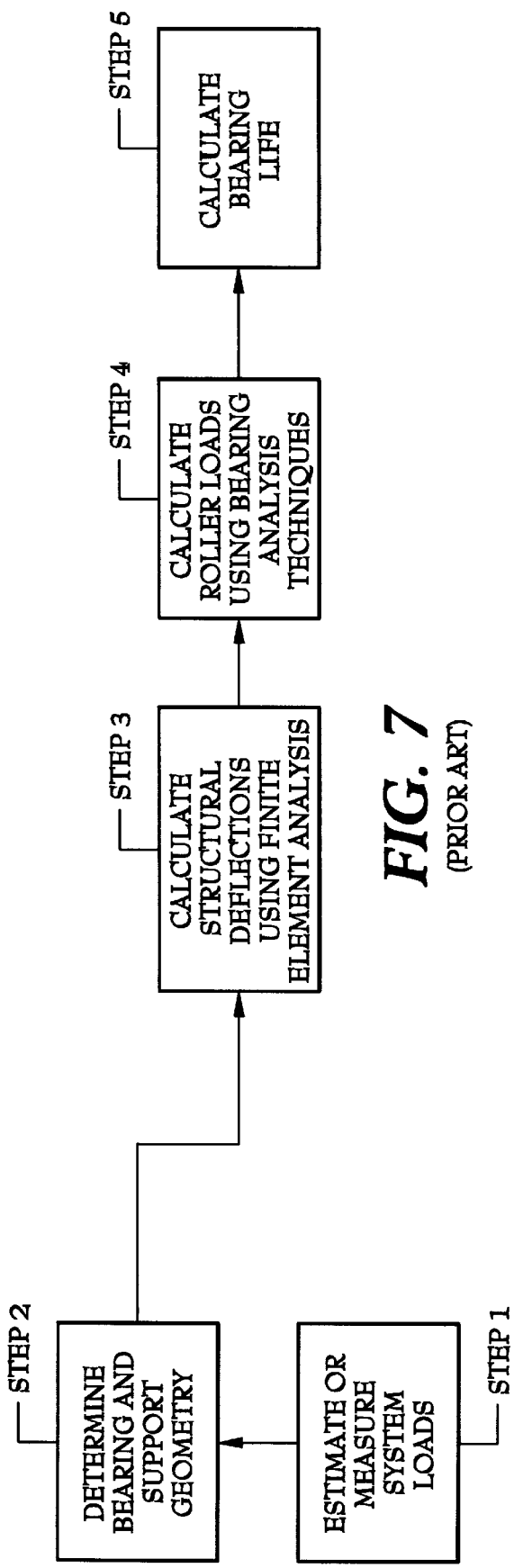
FIG. 7 (PRIOR ART) is a flow chart illustrating steps required in a conventional bearing life calculation.

Conventionally, calculation of bearing life has started with measurements of total applied load to a bearing and used mathematical manipulation to calculate rolling element loads and predict bearing life. By way of example, FIG. 7 (PRIOR ART) is a flow chart of a conventional bearing life calculation. In step 1, the total system loads are estimated or measured. Before processing begins, in step 2, bearing and support geometry are determined and expressed as mathematical relationships. Next in step 3, structural deflections in the bearing are calculated using a finite element analysis.

Individual roller loads are then calculated in step 4 by making an analytical determination of the load distribution based on the geometry of the bearing, the stiffness of the support structure, the clearance in the bearing, and the clearance between the bearing and the support structure. A value representing calculated load per each rolling element is then obtained. By using the calculated rolling element loads, step 5 then calculates bearing life. However, the conventional method for calculation of bearing life typically uses the dimensional values, roundness, and stiffness of the bearing and support structure from manufacturing prints or from measurements. However, if these values are measured, they would not include variations that typically occur between installations. Accordingly, the distribution of total load among the rolling elements may not be accurately determined analytically due to a number of factors, including deformation of the inner and outer races and deformations of the rolling elements themselves.

Moreover, other structures in the bearing assembly such as a hollow spindle, may flex and thereby uncharacteristically divide the load zone about the rolling elements. In short, the number of variables and differences in manufacturing tolerances between seemingly identical bearings makes it exceedingly difficult to accurately predict a load zone about a bearing without multiple measurements about the inner or outer races of the bearing. Moreover, conventional methods for predicting bearing life are more suited to laboratory testing and therefore do not readily lend themselves to real-time applications.

Figure 8:
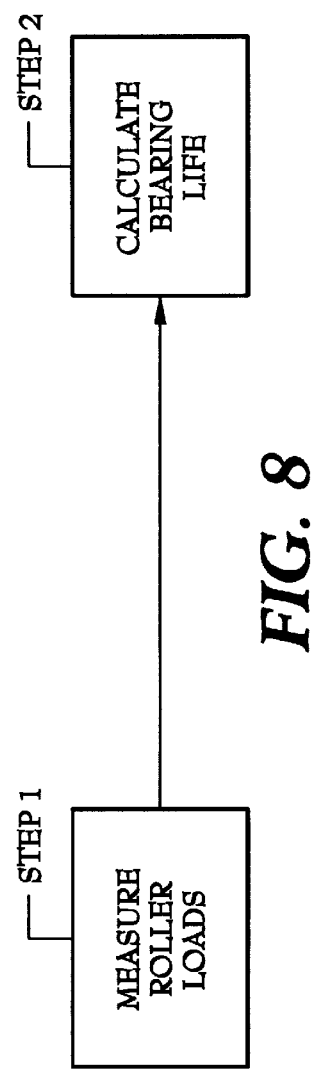
FIG. 8 is a flow chart illustrating a method for predicting bearing life of rolling element bearings according to an embodiment of the present invention.

FIG. 8 is a flow chart of a method of predicting bearing life according to an embodiment of the present invention. According to FIG. 8, in step 1, roller loads corresponding to a plurality of rolling elements are directly measured from a rolling element bearing. In step 2, bearing life is directly calculated from the measured roller loads.

Figure 9:
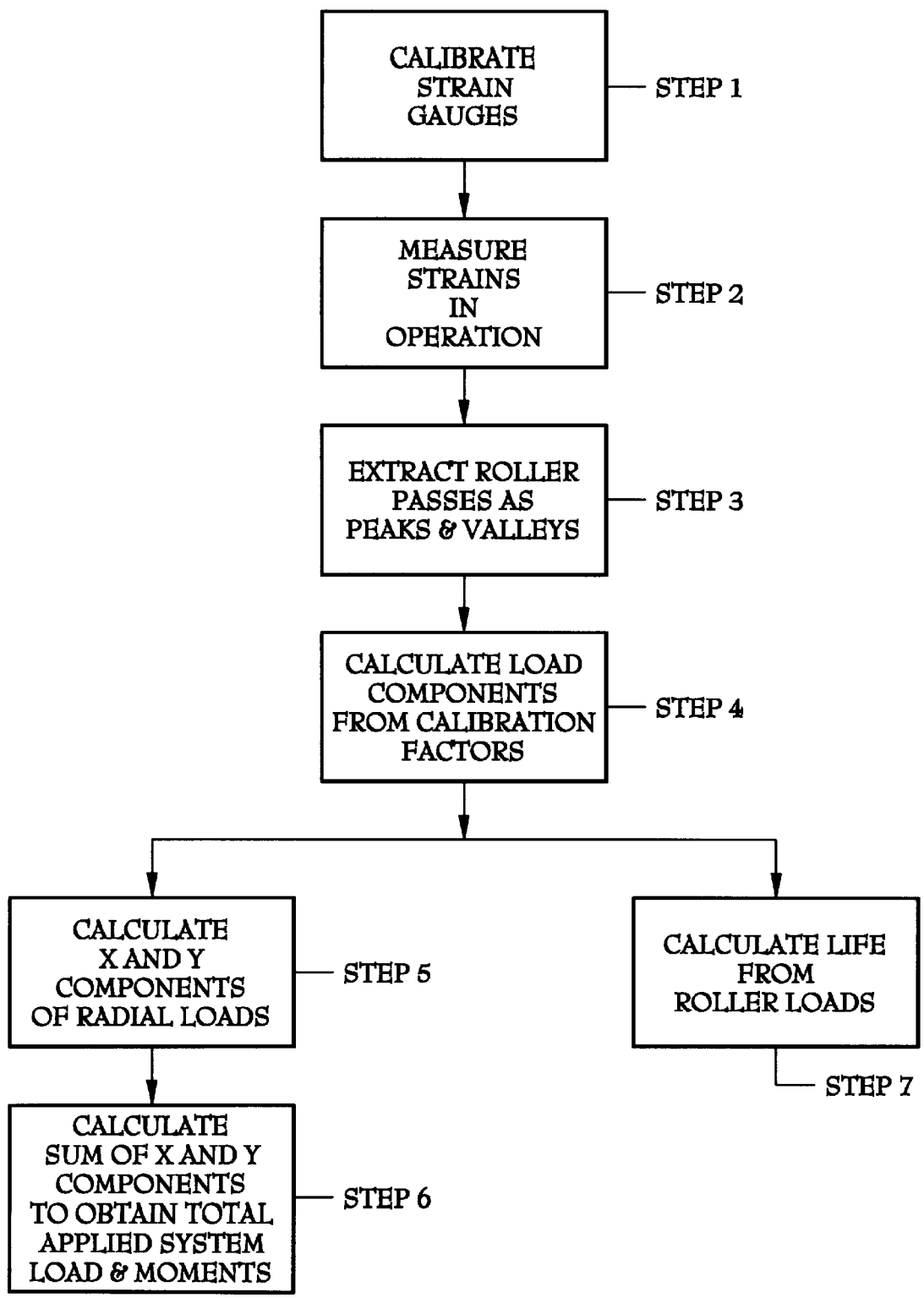
FIG. 9 is a flow chart illustrating a method for predicting bearing life of rolling element bearings according to another embodiment of the present invention.

FIG. 9 is a flow chart of a method of prediction of bearing life according to another embodiment of the present invention. The flow chart of FIG. 9 also illustrates a method for characterization of a bearing load zone.

In step 1 of FIG. 9, a plurality of sensors are calibrated by using a calibration procedure. Preferably, the sensors are in the form of strain gauges. However, the sensors may be in the form of load cells or other sensing devices which are known in the art.

In step 2, the bearing is rotated. In this step, operating pressures are applied to the bearing if the bearing is used in a testing application. On the other hand, the bearing may be rotated during actual operation, for example during actual operation of the bearing in its intended application. The measured sensor loads, i.e. strains, are then measured during operation.

In step 3, the roller passes are extracted from the sensor data for each of the sensors as peaks and valleys, and a graphical representation may be obtained, for example as illustrated in FIG. 4.

In step 4, the individual load components are calculated from the extracted peaks and valleys in combination with the calibration factors calculated in step 1. Once the load components are calculated for each of the sensors in the bearing, a number of different calculations may be made using the load component data. Based upon the load component data obtained in step 4, the total applied system load may be calculated in real-time. Total applied system load is often difficult or even impossible to obtain by using conventional methods during actual operation of the bearing in machinery.

In step 5, the X and Y force components, as illustrated in FIG. 1, are calculated from the individual load components.

In step 6, the individual X and Y components from all bearings in a system are summed to determine a total applied system load and total system moments.

In addition, in step 7, bearing life may be directly calculated from the rolling element loads, determined in step 4, by using the calculated load components.

Calibration Procedure

The sensors in the form of strain gauges are preferably calibrated against a measured value of load from a representative bearing installation of a particular size to be monitored. This calibration may also be performed in conjunction with the application of pre-load during bearing installation.

During this calibration procedure, the bearing must be rotated to record the change in strain as the rolling element passes each gauge. This results in a curve of applied axial load versus measured strain for each gauge. A similar procedure may be used for other types of sensors, such as load cells.

Figure 10A:
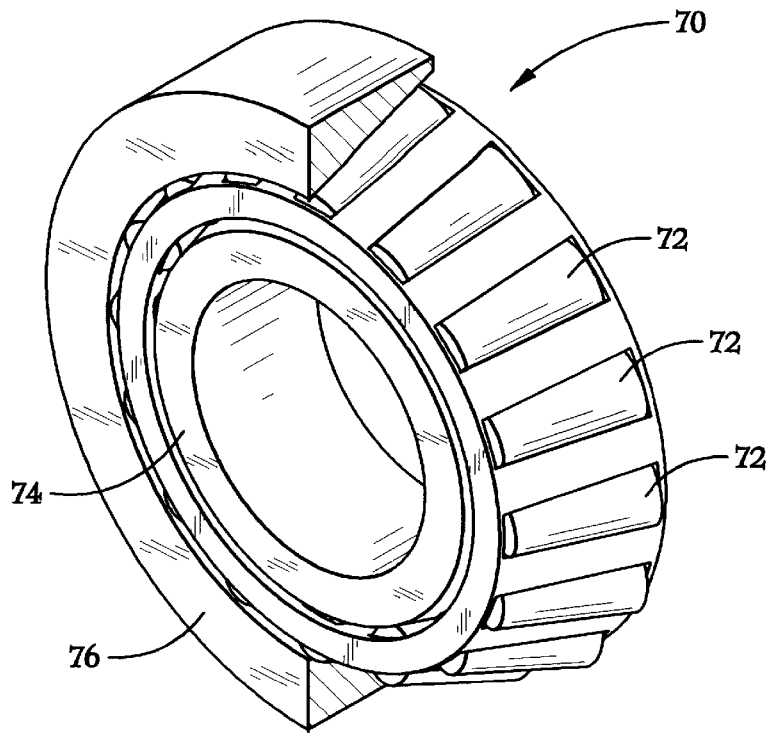
FIGS. 10A and 10B respectively illustrate an elevated perspective view and a sectional view of a tapered roller bearing having an associated force distribution.
Figure 10B:
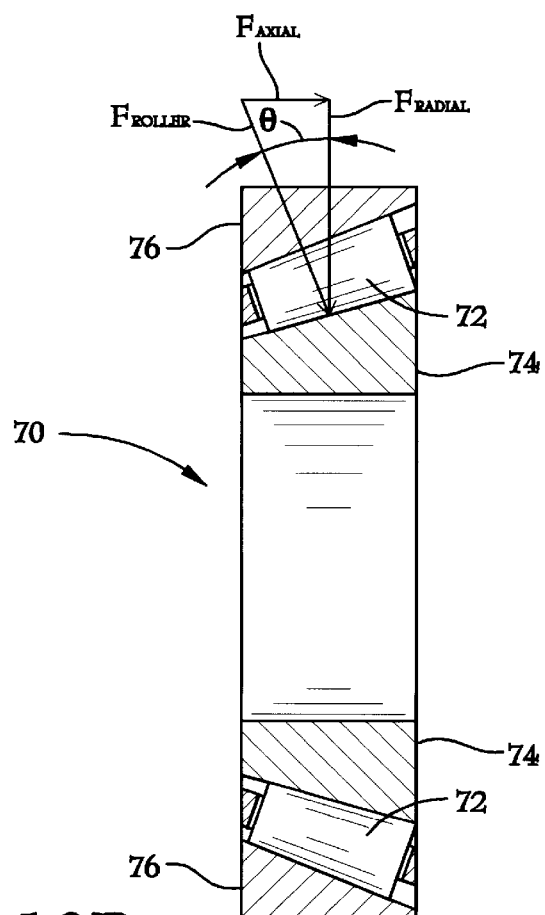

The calibration procedure may be performed using an axial force for an embodiment of the present invention applied to tapered roller bearings. FIGS. 10A and 10B respectively illustrate an elevated perspective view and a sectional view of an embodiment of the present invention in the form of a tapered roller bearing 70. This bearing could be either a radial bearing or a thrust bearing, depending on the bearing contact angle as described below. Tapered roller bearing 70 includes a plurality of rolling elements 72 which transmit rotation between inner race 74 and outer race 76. Tapered roller bearings have the ability to rotate under the application of radial and axial forces. Because tapered roller bearings respond to radial or axial force, pressure may be applied axially and translated into force in the roller direction. As illustrated in Figure 10B, a force perpendicular to the rolling elements $F_{ROLLER}$ may be translated with respect to $F_{AXIAL}$ and $F_{RADIAL}$.

During the calibration procedure for tapered roller bearings, the axial component of load on each roller $F_{AXIAL}$ is determined to be equal to the applied axial load divided by the number of rollers. The applied axial load is translated into the roller direction $F_{ROLLER}$ (defined as the direction normal to the raceway) by dividing by the sine of the bearing contact angle θ, which is different for the bearing inner and outer races of a tapered roller bearing. The bearing cone angle is the angle made between the surface of the inner race and the horizontal. It is this angle that is used in the calculation of roller load when the sensors are mounted on the inner race, or cone. The bearing cup angle is the angle made between the surface of the outer race and the horizontal. It is this angle that is used in the calculation of roller load when the sensors are mounted on the outer race, or cup.

Figure 12:
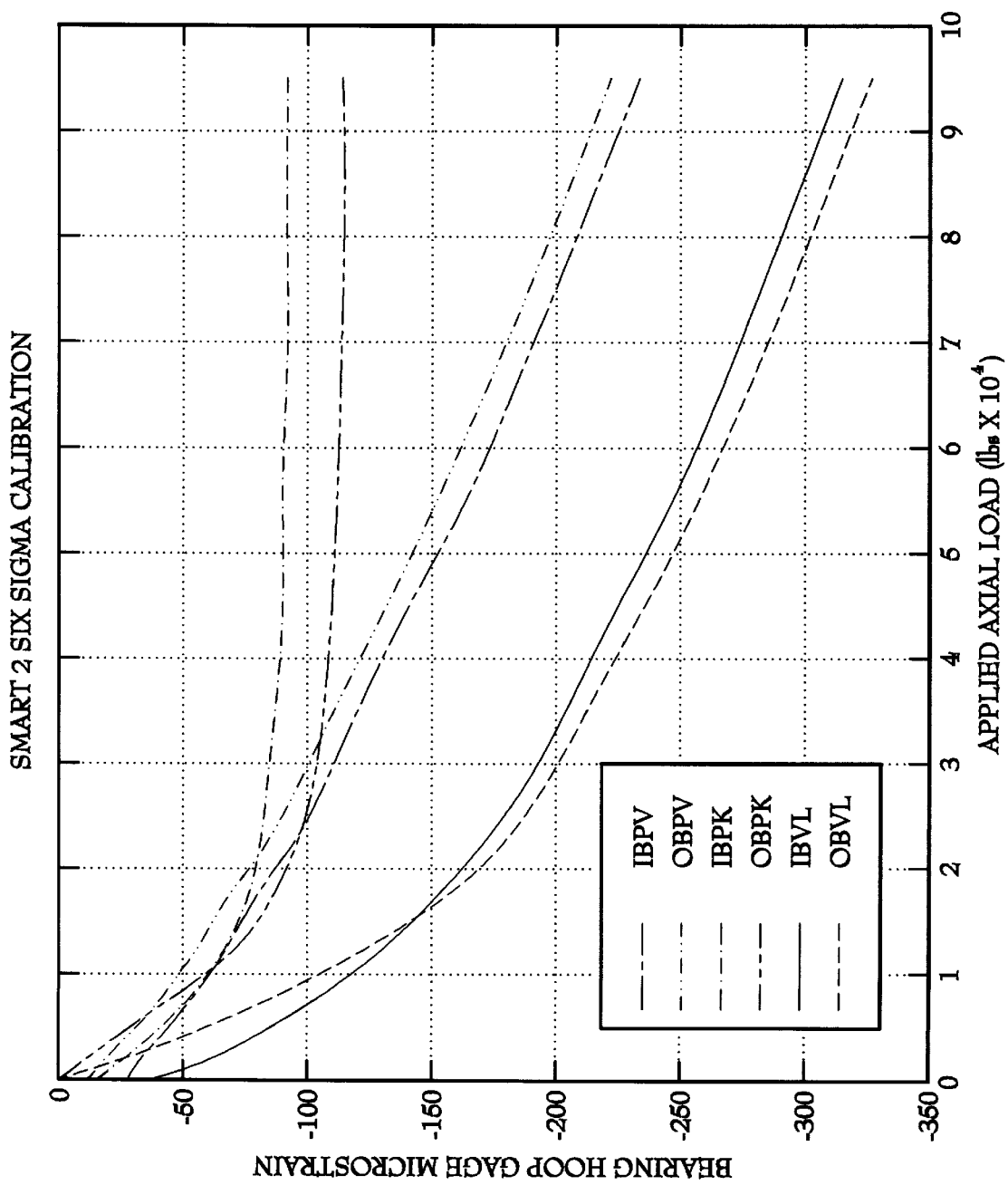
FIG. 12 illustrates axial loads plotted directly against measured strain of each sensor for a sensor calibration procedure.

FIG. 12 illustrates axial loads at each sensor plotted directly against measured strain for each sensor as the axial force $F_{AXIAL}$ is increased. This results in a series of graphs, i.e. load/strain graphs, representing axial load $F_{AXIAL}$ vs. measured strain for each of the sensors. The load/strain graph should be similar for each sensor. To simplify calculations for purposes of calibration, all load/strain graphs may be modeled by a single line having a slope equal to an average of the individual slopes of the load/strain graphs. This slope is then used as the calibration factor in the calculation of roller load, as described below.

The calibration procedure will vary depending upon the type of bearing used. However, the end result of the calibration procedure for different types of bearings will be a calibration factor (either linear or non-linear) which models the relationship of roller load $F_{AXIAL}$ and measured strain.

Determination of Bearing Life

The algebraic signs of strain discussed below follow the standard convention of tensile strain positive and compressive strain negative. During operation of the bearing, hoop strains are measured by each sensor. The resulting data is cyclical and has a frequency equal to the number of passes for each rolling element with respect to each sensor.

With the sensors mounted on the inner race, the values recorded as a rolling element passes each sensor appear as points of relative maximum negative strain or relative minimum positive strain (higher compression). The values recorded as two rolling elements straddle each sensor appear as relative maximum positive strain or relative minimum negative strain (higher tension). With the sensors mounted on the outer race, the values recorded as a rolling element passes each sensor appear as points of relative maximum positive strain or relative minimum negative strain (higher tension). The values recorded as two rolling elements straddle each sensor appear as relative maximum negative strain or relative minimum positive strain (higher compression).

With the sensors mounted on the inner race, points of relative maximum positive strain or relative minimum negative strain correspond to the peaks of the recorded waveform in FIG. 4 and represent the reaction of the inner race to the applied load in the bearing. Points of relative maximum negative strain or relative minimum positive strain correspond to the valleys of the recorded waveform in FIG. 4 and represent the strain due to the load of the rolling element passing over the gauge in addition to the reaction to the load from the other rolling elements, as described above. Therefore, the strain due to the rolling element load alone is the difference between the waveform valleys and peaks. This is called the rolling element hoop strain.

The equivalent rolling element load for every recorded value of strain is obtained by multiplying the rolling element hoop strain at every time sample by the calibration factor determined in the calibration procedure. This is resolved into horizontal and vertical components at the angular position of the strain gauge on the bearing race. By summing like components over all the gauges on each bearing race, then computing the magnitude and angle of the resulting vector, the total load applied to the system is determined.

In a pair of opposing bearings in a complimentary arrangement, such as in truck wheel bearings, the sum of the vertical load components is the total applied radial load. The sum of the horizontal components in the direction of travel is the traction load. The sum of the horizontal components in the axial direction (of opposite sign for each bearing due to their orientation) is the thrust load.

The roll moment is the product of the vertical component and the distance from the load center of each bearing race to the point of application of the load. The yaw moment is the product of the horizontal component in the direction of travel and the distance from the load center of each bearing race to the point of application of the load. The system does not support a moment about the bearing axis due to its rotation.

Detailed Calculations

Sensor data is passed through low-pass filter 67 as illustrated in FIG. 6 to eliminate any spurious readings. However, low-pass filter 67 may be executed by control unit 56 after the sensor data has been converted into digital form. Additionally, the sensor data may be passed through low-pass filter 67 and then subjected to further conditioning by a digital filter in control unit 56.

After the sensor data signal has been conditioned, the peaks and valleys are extracted using a peak-picking algorithm by the control unit 56. The load on each roller and its axial and radial components are then calculated for an embodiment of tapered roller bearings as follows:

First, the strain readings are converted into equivalent axial loads using the slope calculated during the calibration procedure described above.

$$Fax_{ij} = strain_{ij}/N \cdot a$$

where $Fax_{ij}$=axial component of load for the jth roller during the ith time sample $strain_{ij}$=measured value of strain at the jth roller during the ith sample ($\mu \epsilon$)

N=number of rollers a=calibration factor to convert strain readings into axial loads (lbs/$\mu \epsilon$)

Then the axial components of load are converted into radial and roller components by using the contact angle of the bearing. Variables referring to individual samples are designated with an i subscript; and variables which refer to individual rollers are designated with a j subscript as well:

$$Frad_{ij} = Fax_{ij}/\tan \gamma$$

$$Froller_{ij} = Fax_{ij}/\sin \gamma$$

where $\gamma$=contact angle of bearing $Frad_{ij}$=radial component of load for jth roller during ith time sample $Froller_{ij}$=load on jth roller during ith time sample The radial component is further resolved into x and y components in the plane of the bearing as follows:

$$(Frad_{ij})_x = Frad_{ij} \cdot \cos \theta_j$$

$$(Frad_{ij})_x = Frad_{ij} \cdot \cos \theta_j$$

where $\theta_j$=the angle of the jth roller in the vertical plane

The total load on the bearing in the vertical direction and in the direction of travel are the x and y components, respectively, summed over the n rollers. In an embodiment having two bearings for a single axle, i.e. an inboard bearing (IB) and an outboard bearing (OB), the total load on the bearing is additionally summed over both bearings as follows:

$$Fx_i = \left[\sum_{j=1}^{n}(Frad_{ij})_x\right]_{IB} + \left[\sum_{j=1}^{n}(Frad_{ij})_x\right]_{OB}$$

-continued $$Fy_i = \left[\sum_{j=1}^{n}(Frad_{ij})_y\right]_{IB} + \left[\sum_{j=1}^{n}(Frad_{ij})_y\right]_{OB}$$

The third component in Cartesian space is in the axial direction, where the force was defined above as the measured strain divided by the calibration factor. These forces are summed over the rollers for both of the inboard and outboard bearings to arrive at the axial component of the applied load:

$$Fz_i = \left[\sum_{j=1}^{n}Fax_{ij}\right]_{IB} + \left[\sum_{j=1}^{n}Fax_{ij}\right]_{OB}$$

The total force vector then is the resultant of these three components, the magnitude and directions of which are defined as:

$$|F_i| = \sqrt{Fx_i^2 + Fy_i^2 + Fz_i^2}$$

$$angle1_i = \tan^{-1}\left(\frac{Fy_i}{Fx_i}\right)$$

$$angle2_i = \tan^{-1}\left(\frac{Fy_i}{Fz_i}\right)$$

where:

angle$1_i$=the angle of the force vector in the vertical (x-y) plane for the ith time sample angle$2_i$=the angle of the force vector in the horizontal (y-z) plane for the ith time sample Calculation of Bearing Life According to an embodiment of the present invention, bearing life for rolling element bearings is calculated at each time sample as follows:

$$life_i = \{speed_i\}\left\{\frac{capacity}{\sum_{j=1}^{n}Froller_{ij}}\right\}^p K$$

where:

lifei=life estimate for the ith time step (hours)

speed$_i$=rotational speed of the bearing at the ith time sample capacity=total bearing capacity p=3 for ball bearings 10/3 for roller bearings K=proportionality constant This is a prediction of how long the bearing would last if the conditions occurring during each time sample were to continue until bearing failure occurred.

Each time sample is then treated as a seperate set of operating conditions and added as follows:

$$L_{10}life = \frac{1}{\sum_{i=1}^{t}(1/life_i)}$$

provided the time between each sample is the same
where:

p$_i$=percentage of time bearing operates at ith operating condition life$_i$=estimated $L_{10}$ life for ith sample t=number of time samples The calculated value for estimated life during each time sample is reported directly to provide the user with an indicator of the severity of bearing service in real-time. The calculated value is then multiplied by the duration of time of load application and iteratively summed to provide an estimate of expended theoretical life of the bearing. This is reported to the user to identify the need for bearing service.

Temperature Compensation

The sensors 44 are preferably in the form of strain gauges, which respond to changes in temperature. Strain gauges are conventionally manufactured by bonding a thin strip of metal to a polymer film. The polymer film is then adhered to a surface for measurement of strain. Before applying the strain, an electrical current is passed through the gauge and the electrical resistance is measured. Upon application of a load to the strain gauge, the strip of metal physically deforms along with the applied surface. As the metal physically deforms, the electrical resistance changes, and the change in resistance is converted into strain. The gauge factor ("GF") of a strain gauge is as follows:

$$GF = \frac{\Delta R/R}{\Delta L/L} = \frac{\Delta R/R}{strain}$$

where:

GF=gauge factor $\Delta R$=change in resistance of strain gauge

R=resistance of strain gauge at ambient temperature $\Delta L$=change in physical length of strain gauge L=length of strain gauge at ambient temperature strain=$\Delta L/L$ In other words, by measuring the resistance change in the gauge, the change in strain in the specimen can be uniquely determined.

Generally, the effect of temperature on the accuracy of the above calculations may be considered negligible. The effect of temperature is considered negligible because the present strain gauges measure a change in strain as illustrated in FIG. 4, rather than absolute strain. Accordingly, linear temperature effects on the strain gauge are eliminated through subtraction. Non-linear temperature effects are further considered negligible due to relatively small changes in temperature once the bearing has stabilized at an operating temperature. However, the electrical resistance of the thin strip of metal will also change in response to a change in temperature.

Nevertheless, numerous methods may be employed to provide temperature compensation such that the accuracy of the calculations may be enhanced. According to an embodiment of the invention, the bearing system is adjusted for temperature by first recording the output of the strain gauges under a "no-load" condition while the temperature is varied. The output resistance of the strain gauge is then recorded for a plurality of predetermined temperature intervals. The output resistance is referred to as "apparent strain" and the values are stored in a look-up table for later recall.

During the operation of the bearing system under a load condition, the resistive component of temperature is measured along with the resistive component of strain. In other words, the strain that is output from the gauge includes the actual strain plus the apparent strain (due to temperature). At this juncture, the actual temperature of the bearing may be measured and the apparent strain which corresponds to the measured temperature may be determined from a look-up table. The look up function may be performed manually and the data accordingly adjusted. On the other hand, the control unit 56 may execute the look up function via software. This form of temperature compensation is referred to as intelligent temperature compensation. Thus, to arrive at the actual strain, the apparent strain is subtracted from the total measured strain as follows:

$$\text{strain}_{actual} = \text{strain}_{measured} - \text{strain}_{apparent}$$

Another form of temperature compensation may be employed mounting a second strain gauge in a non-load-bearing, temperature-sensitive location. In this regard, the second strain gauge should be placed in such close proximity to the first strain gauge to vary correspondingly in temperature. The second strain gauge may be placed in a non-load-bearing location by simply rotating the gauge 90 degrees from the first strain gauge. The output of the second strain gauge is then connected in position X as indicated in the bridge circuit of FIG. 6.

Since the calculation of bearing load and life is derived from the difference between the maximum and minimum strains (which are the measurements recorded as the roller passes over the gauge) the effects of temperature on gauge resistance does not enter into the result. This is because the temperature does not change appreciably between these two readings, since the roller passes over the gauge in a very short period of time (for example, for a bearing with 20 rollers rotating on a shaft at 120 rpm, the time from one roller passage to the next along the inner race is approximately 50 milliseconds). This is calculated as the shaft speed divided by the number of rollers times a factor approximately equal to 0.6 for most bearings. This multiplicative factor varies with the geometry of the bearing and is approximately equal to 0.4 for the bearing outer race. It is required to account for the difference between the speed of the rolling elements on the inner race and the speed of the rolling elements on the outer race versus the speed of one race relative to the other.

However, there is a slight change in the gauge factor with temperature that will affect our measurement. However, the sensitivity of gauge factor to temperature is so small that it is typically neglected. For example, Vishay Measurements Group Catalog 500 sets forth that the variation in gauge factor for a temperature increase of 175° F. (from 75° F. to 250° F.) is approximately 1%. In practice, it has been found that temperature increases on the order of 30° F during operation of bearings according to the present invention. This translates into an effect of about 0.16%. However, if high accuracy measurements need to be made, the error could be eliminated as set forth above by using a look-up table containing the variation of gauge factor with temperature.

Lubrication Correction

The predication of bearing life set forth above may be further adjusted for lubrication. A lubrication factor for correction of the bearing life value will depend upon a number of factors and vary with respect to the type of lubricant involved. Most anti-friction bearing lubricants will have an effect on bearing life which is proportion to fluid viscosity, with fluid viscosity being dependent upon temperature. Accordingly, the bearing life equation set forth above may be corrected in accordance with a look-up table in the same manner as the strain gauge look-up table set forth above with respect to temperature.

Preload Monitor

The preload in the bearing is determined by a number of factors, all of which are related to the internal clearance in the bearing. In other words, the amount of preload is related to the physical space set for the rolling elements between the inner and outer races. The preload is generally applied to the bearing by displacing the bearing inner and outer races relative to each other, which reduces the internal clearance. The amount of preload that has been applied to the bearing is generally monitored by measuring the axial force required to produce this displacement. However, this technique is inaccurate because the relationship between applied force and displacement is not linear. A number of factors influence the preload as follows:

1. As the internal clearance in the bearing decreases, the system becomes stiffer, meaning that an increase in load results in a smaller increase in displacement;

2. As the diameter of the bearing inner race reduces to the point where it begins to contact the shaft and the diameter of the outer race expands to the point where it contacts the housing, the system becomes even stiffer due to the added support of the structure; and 3. As the inner race begins to contact the shaft, a frictional force develops between the bore of the inner race and the shaft, so that all of the force applied to the bearing no longer goes into displacing it relative to the outer race. An analogous situation exists where the outer race is disposed relative to the inner race as preload is applied.

The above effects are apparent when the strain is measured in the bearing race.

Turning to FIG. 12, the above effects are apparent when the strain is measured in the bearing race. It should be noted that the changes in slope are due to the increase in system stiffness and frictional forces. Therefore, it becomes readily apparent that bearing strain does not increase proportionally with load. Thus, the conventional method of bearing load calculation set forth above with respect to FIG. 7 introduces significant error.

Because the relationship between applied axial force and bearing clearance is not linear, the measured strain provides a better indication of preload than applied axial force. In other words, by measuring the roller loads in the bearing, the bearing may be preloaded to a value of roller load rather than to a value of applied axial load.

Additional Monitor Information

The above-described system provides an output of the applied loads on the bearing, the loads on individual rollers, and the estimated life of the bearing. However, there are other outputs available, as well as other information that may be inferred from the above information as follows.

External load may be readily determined from the subject invention. The roller loads are calculated for the purpose of determining bearing life. However, the external loads may be calculated from the sum over a plurality of bearings (in a multi-bearing system) by summing coordinate components of Fx, Fy and Fz. Additionally, the moments may be calculated from the difference of these components times the distance between the bearings. The characterization of the external loading on the bearings may be used for a variety of purposes. For example, in a vehicle with bearings installed in the wheels, the total in the vertical direction would be an indication of vehicle weight. This could eliminate the need to weigh freight-carrying vehicles on the highway. A second example relates to industrial application. The total load vector and moments could be used to diagnose equipment problems or make process improvements (e.g. controlling stock thickness in rolling mills). Further applications include monitoring the amount of work performed by a machine (e.g. monitoring the number of coils output through a mill or the load/speed history of machinery to schedule maintenance).

The above information may further be used to characterize the load distribution. The characterization of load distribution can be used to assess the structure supporting the bearing. The detection of multiple load zones, for example, could indicate a weak support structure; variations in the shape of the load zone among similarly-loaded bearings could indicate that a housing or shaft has developed an out-of-roundness or high clearance condition.

Figure 11B:
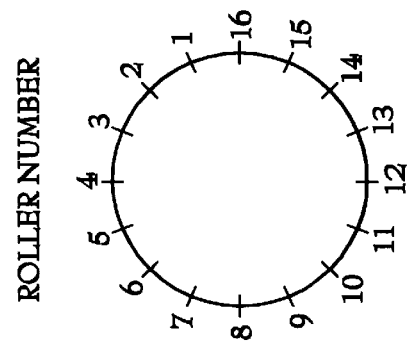
FIGS. 11A and 11B respectively illustrate a measured bearing strain distribution and corresponding gauge placement.
Figure 11A:
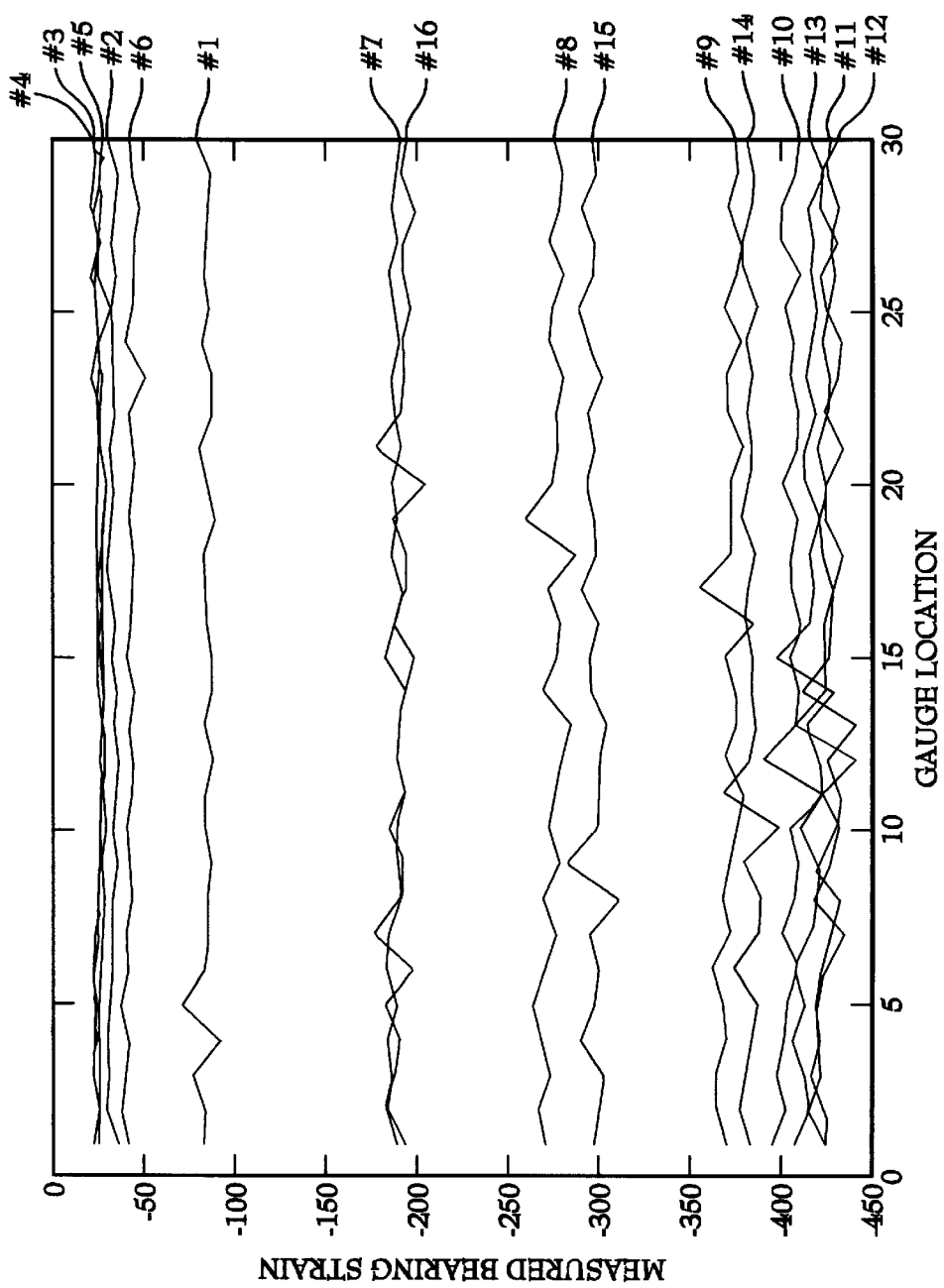

Moreover, roller condition may be assessed during operation. An assessment of the individual roller within the bearing may be made by sorting the strain data collected from each roller and observing differences between them. Multiple samples collected on the same roller may be averaged together to improve the reliability of the assessment. Observations of multiple strain gauges can further refine the assessment, although these must be shifted in time to overlay directly. For example, as illustrated in FIG. 11A, a plot of averages of multiple strain readings from each roller may be made. It is apparent from the graph of FIG. 11A that there is a large difference in 1, 2, or 3 rolling elements from the remainder of the rolling elements as evident from every gauge. Though the spikes in the data associated with the rollers are not aligned, if they were shifted according to position of the gauge on the race, the data would fall directly on top of one another. This provides evidence of a rolling element that may be in need of repair or replacement. A similar procedure could be used to assess the condition of the race opposing the one on which loads are being measured. Additionally, a monitoring function may be provided to count the occurances of rolling element loads that exceed a predetermined threshold. In this way, potentially damaging events may be identified at the time of their occurance.

Batch v. Real-Time Calculations

The present invention can be used to calculate rolling element loads and bearing life as a single set of calculations for a discrete event (or series of events) of finite duration or continuously for an indefinite duration. If the calculation is performed on discrete events of finite duration it is considered a batch calculation. Even though the bearing loads and the predicted life are calculated for every time sample, the data is input into the control unit all at once, and the calculation is performed on only the samples provided. The results are then output from the controller all at once.

If the calculation is performed continuously, it is said to be made in real-time. For a real-time calculation, one set of readings from every sensor is input into the controller as soon as it becomes available. The calculation is then performed using only that set of readings along with prior readings. The results are then output before the next set of samples becomes available. In this way, a continuous stream of results is output from the controller for as long as the bearing is being operated.

The foregoing is considered as illustrative only of the principles of the invention, and since numerous modifications and changes will readily occur to those skilled in the art, it is not desired to limit the invention to the exact construction and operation shown and described, and accordingly, all suitable modifications and equivalents may be resorted to, falling within the scope of the following claims.

Having described the invention, what is claimed is:

1. A system for sensing rolling element loads in a rolling element bearing having a plurality of rolling elements disposed between an inner race and an outer race, comprising:

a plurality of sensors disposed about one of the inner race and the outer race of the bearing to output sensor data corresponding to detected loads caused by the rolling elements;

a plurality of connecting members respectively connected to each of said plurality of sensors to transmit the sensor data; and a control unit to receive the sensor data from said plurality of connecting members, wherein said control unit calculates load components corresponding to each of the sensors in the rolling element bearing from the received sensor data and predicts bearing life from the calculated load components.

2. The system for sensing rolling element loads according to claim 1, wherein said plurality of sensors are evenly disposed about said one race of the bearing.

3. The system for sensing rolling element loads according to claim 2, wherein each of the sensors are radially aligned to corresponding rolling elements along a radial line extending from a central axis of the bearing through the corresponding rolling element when the bearing is at rest, such that the sensor data is simultaneously transmitted from each of said plurality of sensors in real time when the bearing is in motion.

4. The system for sensing rolling element loads according to claim 1, wherein each of the sensors are radially aligned to corresponding rolling elements along a radial line extending from a central axis of the bearing through the corresponding rolling element when the bearing is at rest, such that the sensor data is simultaneously transmitted from each of said plurality of sensors in real time when the bearing is in motion.

5. The system for sensing rolling element loads according to claim 1, wherein said plurality of sensors includes three sensors disposed respectively at positions of 90°, 180°, and 270° from a radial line extending upward from a center of the bearing.

6. The system for sensing rolling element loads according to claim 5, wherein said plurality of sensors further includes a fourth sensor disposed at a position of 0° along the upwardly extending radial line.

7. The system for sensing rolling element loads according to claim 6, wherein said plurality of sensors further includes fifth, sixth, seventh, and eighth sensors disposed respectively at positions of 45°, 135°, 225°, and 315°.

8. The system for sensing rolling element loads according to claim 1, wherein said plurality of sensors includes eight sensors which are evenly disposed about said one race of the bearing.

9. The system for sensing rolling element loads according to claim 1, wherein said plurality of sensors includes five sensors which are evenly disposed about a portion of said one race of the bearing.

10. The system for sensing rolling element loads according to claim 1, wherein the sensor data includes speed data corresponding to a measured speed of rotation of the bearing, and said control unit calculates bearing life using the measured speed data.

11. The system for sensing rolling element loads according to claim 10, further comprising:

a temperature measuring unit to measure bearing temperature during rotation of the bearing, wherein said control unit calculates bearing life using the measured bearing temperature, the sensor data and measured bearing speed.

12. The system for sensing rolling element loads according to claim 1, wherein said control unit determines a load zone of the bearing in real time from the sensor data.

13. A system for sensing individual rolling element loads in a rolling element bearing having a plurality of rolling elements disposed between an inner race and an outer race, comprising:

a plurality of sensors disposed about one of the inner race and the outer race of the bearing to output sensor data corresponding to detected loads from the rolling elements;

a plurality of connecting members respectively connected to each of said plurality of sensors to transmit the sensor data; and a control unit to receive the sensor data from said plurality of connecting members, wherein said control unit calculates load components corresponding to each of the sensors in the rolling element bearing from the received sensor data, and determine a load zone of the bearing from the calculated load components.

14. The system for sensing according to claim 13, wherein said control unit receives the sensor data and determines the load zone of the bearing in real time.

15. A system for sensing individual rolling element loads in a rolling element bearing having a plurality of rolling elements disposed between an inner race and an outer race, comprising:

means for sensing individual loads corresponding to the plurality of rolling elements;

means for calculating load components corresponding to each of the sensed individual loads in the rolling element bearing;

means for measuring bearing speed during rotation of the bearing; and means for calculating bearing life from the individually calculated load components and the measured bearing speed in real time.

16. The system according to claim 15, wherein said sensing means further comprises a strain gauge in a bridge circuit which outputs sensor data of the individual loads from the plurality of rolling elements.

17. The system according to claim 15, wherein said sensing means comprises a plurality of sensors which are evenly disposed about one of the inner race or outer race of the bearing, such that each of the sensors are aligned to corresponding rolling elements along a radial line extending from a central axis of the bearing through the corresponding rolling element when the bearing is at rest.

18. The system for sensing rolling element loads according to claim 17, wherein said plurality of sensors includes five sensors which are evenly disposed about a portion of the race of the bearing.

19. The system for sensing rolling element loads according to claim 17, wherein said plurality of sensors includes eight sensors which are evenly disposed about one of the inner race and the outer race of the bearing.

20. The system for sensing rolling element loads according to claim 15, further comprising:

means for inputting capacity data such that said calculating means calculates bearing life from the individual loads, measured bearing speed and the inputted capacity data in real time.

21. The system for sensing rolling element loads according to claim 15, wherein said calculating means determines a load zone of the bearing in real time from the individual loads and the measured bearing speed.

22. A method of predicting bearing life in a rolling element bearing, comprising the steps of:

sensing individual loads caused by a plurality of rolling elements in the rolling element bearing;

calculating individual load components corresponding to each of the sensed individual loads in the rolling element bearing;

measuring bearing speed during rotation of the bearing; and calculating bearing life from the calculated individual load components and the measured bearing speed.

23. A method of determining a load zone in a rolling element bearing, comprising the steps of:

sensing individual loads of a plurality of rolling elements in the rolling element bearing;

calculating individual load components corresponding to each of the sensed individual loads in the rolling element bearing; and calculating a load zone from the calculated individual load components.

24. A method of calculating load components in a rolling element bearing, comprising the steps of:

calibrating a plurality of sensors disposed about one of an inner race and outer race of the bearing to establish a relationship between roller load and measured strain;

measuring sensor data from the plurality of sensors during rotation of the bearing; and calculating load components corresponding to each of the sensors in the bearing, to thereby characterize a load zone of the bearing.

25. The method of calculating load components in a rolling element bearing according to claim 24, further comprising the step of:

extracting peaks and valleys from the sensor data for each of the sensors.

26. The method of calculating load components in a rolling element bearing according to claim 25, further comprising the step of:

calculating bearing speed from the passage of rolling elements by the sensors.

27. The method of calculating load components in a rolling element bearing according to claim 26, further comprising the step of:

predicting bearing life from the calculated load components and calculated bearing speed.

28. A method of calculating total applied system load in a system including a plurality of rolling element bearings, comprising the steps of:

calibrating a plurality of sensors disposed about each rolling element bearing to model a relationship of roller load and measured strain;

measuring sensor data from the plurality of sensors for each of the rolling element bearings during rotation of the bearings;

extracting peaks and valleys from the sensor data for each of the sensors corresponding to each of the rolling element bearings;

calculating bearing speed for each of the rolling element bearings from the passage of rolling elements by the sensors;

determining perpendicular force components for each of the bearings from the extracted peaks and valleys and calculated bearing speed; and summing each of the respective Cartesian force components for each of the bearings to obtain total applied system load.

29. The system for sensing rolling element loads according to claim 1, wherein the sensor data output by said sensors is characterized by cyclical data corresponding to passage of each rolling element having a valley, a peak and two zero crossings, and the time between upward zero crossings establishes the speed of the rolling elements.

30. The system for sensing rolling element loads according to claim 13, wherein the sensor data output by said sensors is characterized by cyclical data corresponding to passage of each rolling element having a valley, a peak and two zero crossings, and the time between upward zero crossings establishes the speed of the rolling elements.

31. The system for sensing individual rolling element loads according to claim 15, wherein said means for measuring bearing speed analyzes cyclical sensor data output by sensors which is characterized by valleys, peaks and zero crossings, and the time between upward zero crossings establishes the bearing speed.

32. The method of predicting bearing life according to claim 22, wherein bearing speed is measured from cyclical sensor data of the sensed individual loads having valleys, peaks and zero crossings, and the time between upward zero crossings establishes the bearing speed.

33. The method of determining a load zone according to claim 23, wherein bearing speed is measured from cyclical sensor data of the sensed individual loads having valleys, peaks and zero crossings, and the time between upward zero crossings establishes the bearing speed.

34. The method of calculating load components according to claim 24, wherein bearing speed is determined from the measured sensor data having valleys, peaks and zero crossings, such that the time between upward zero crossings establishes the bearing speed.

* * * * *